Sept. 13, 1966 D. U. WHITE ETAL 3,272,116
JUICE EXTRACTOR FOR TESTING CITRUS FRUIT
Filed Nov. 5, 1964 4 Sheets-Sheet 1
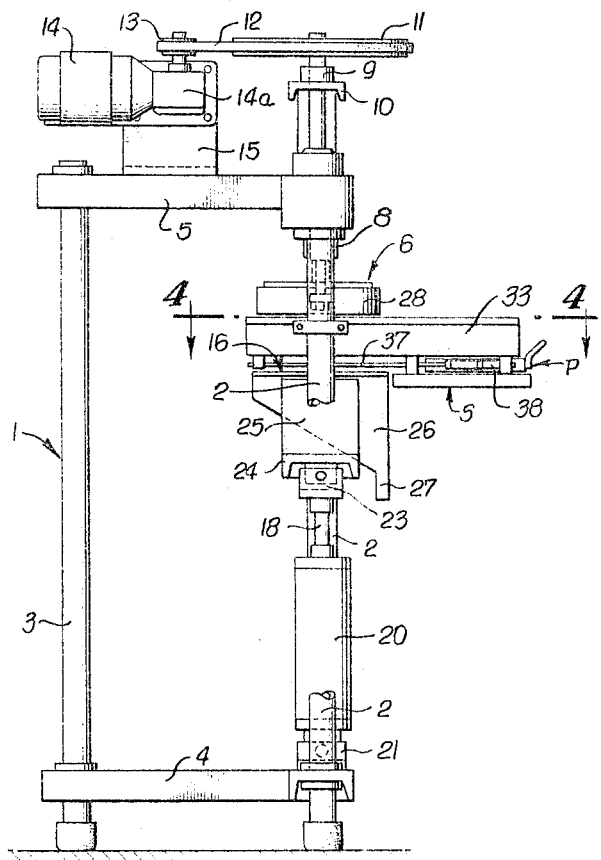
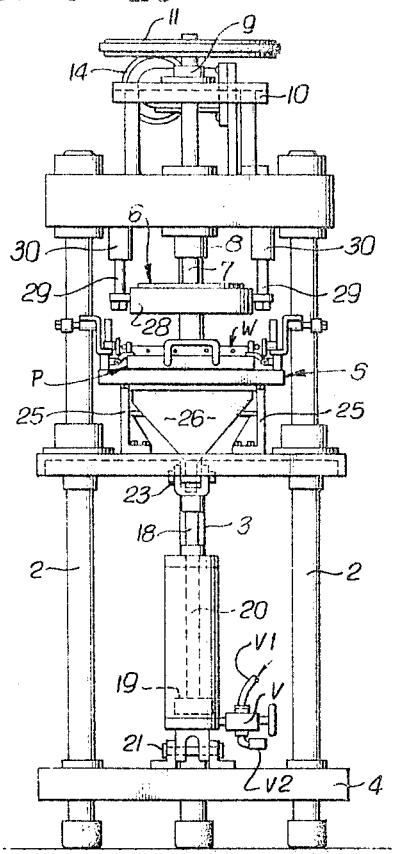
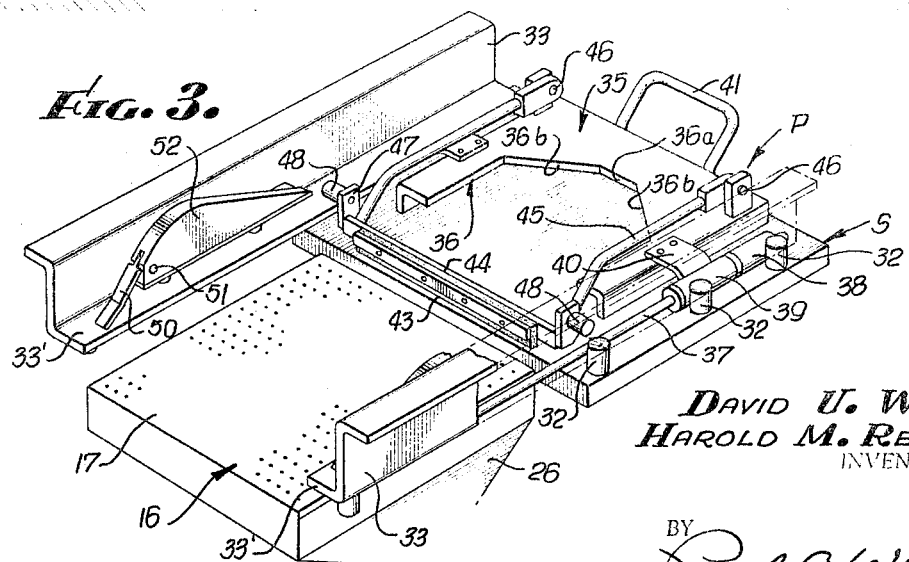
DAVID U. WHITE
HAROLD M. REBECK
INVENTORS.
BY Paul A. Weiler
ATTORNEY.

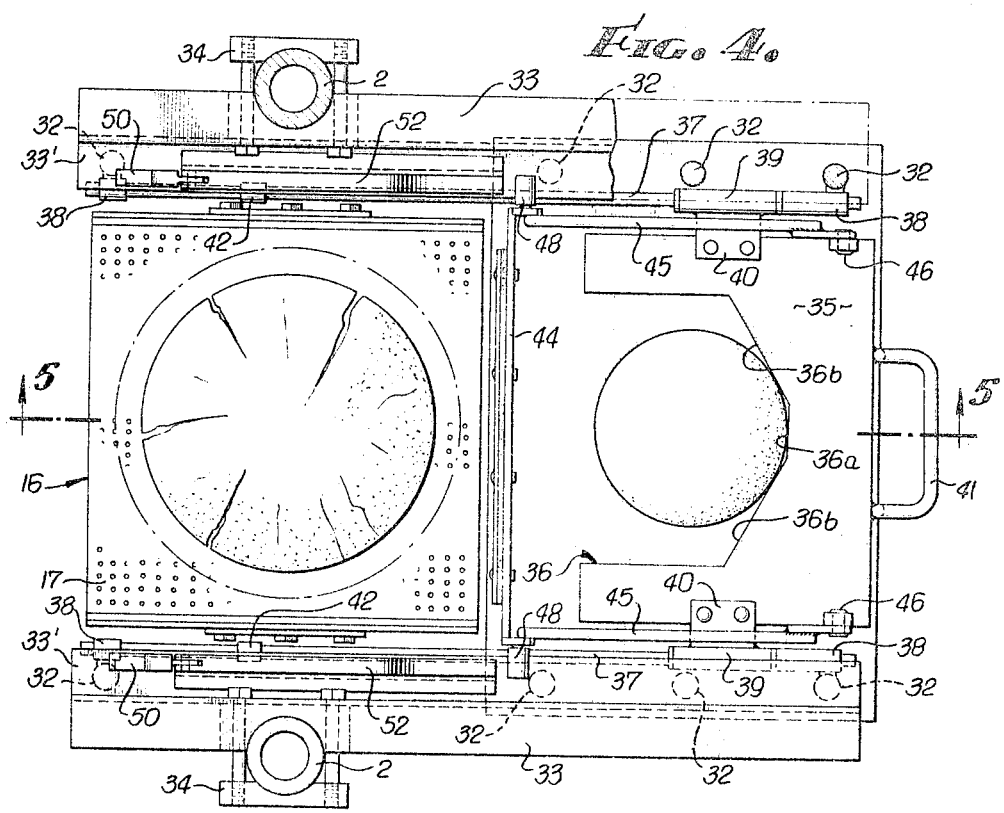
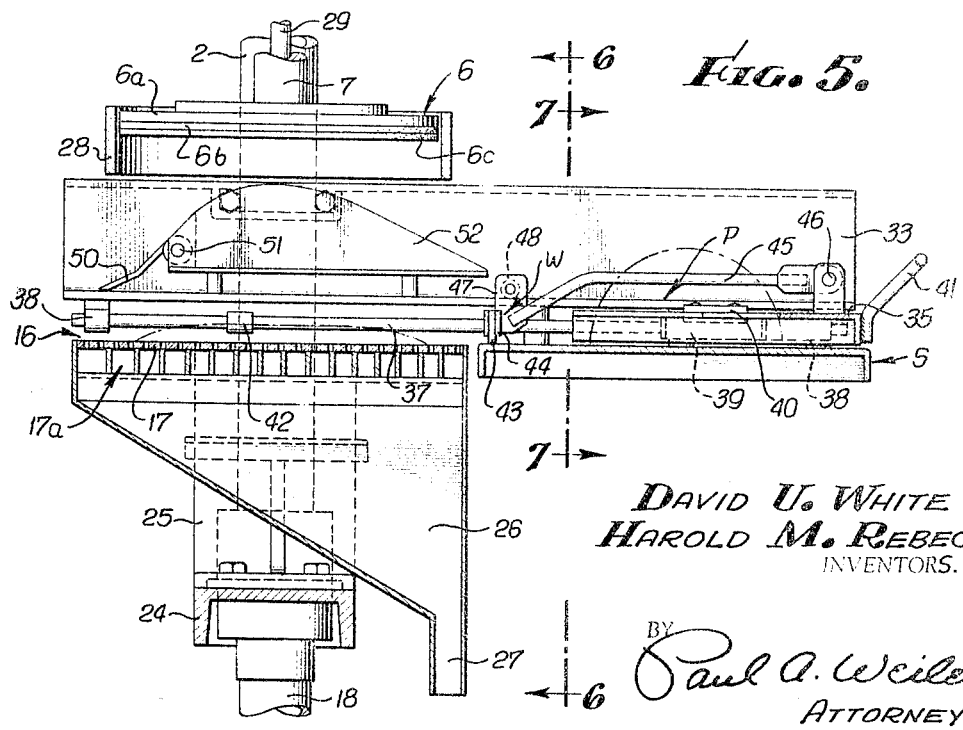

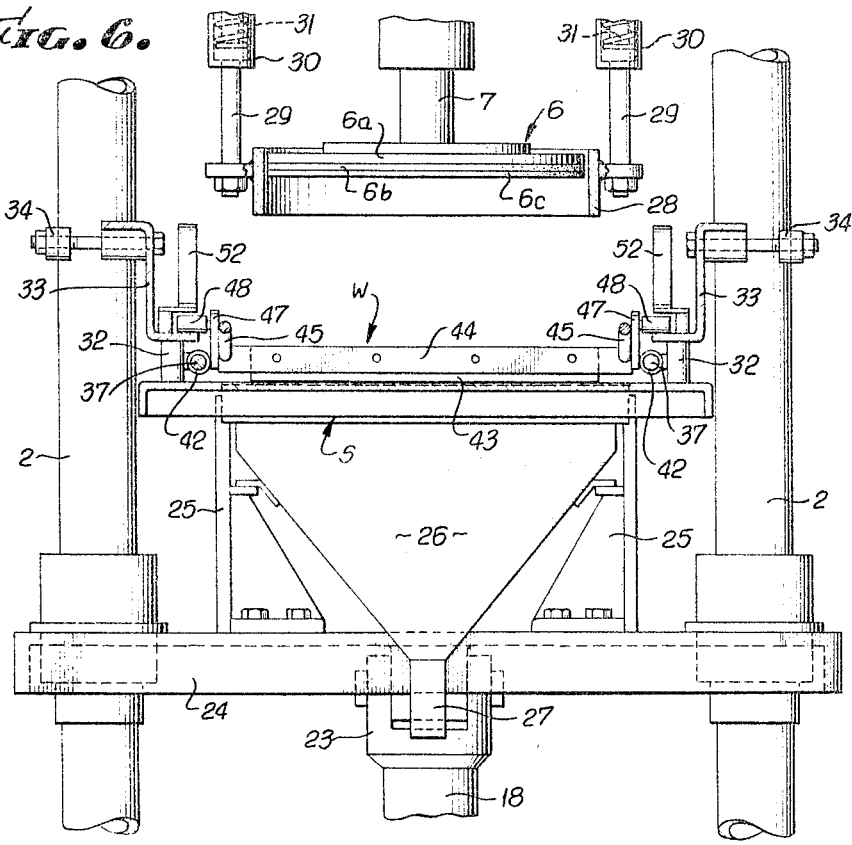
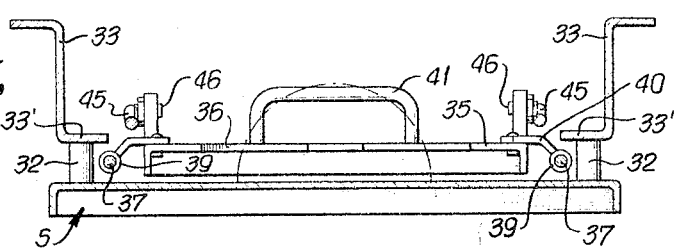
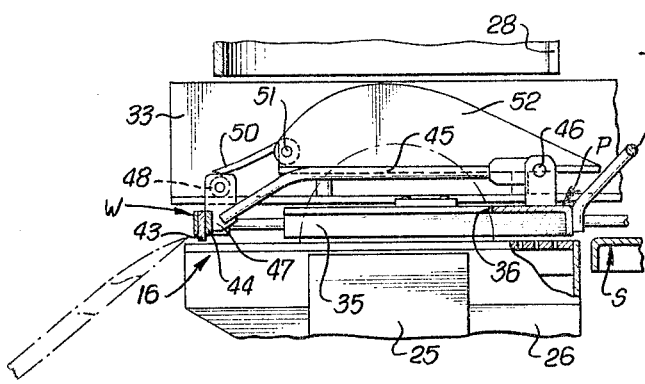

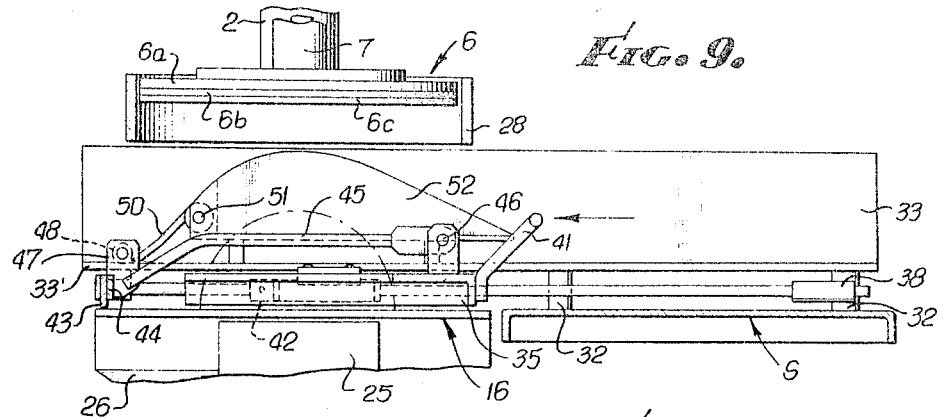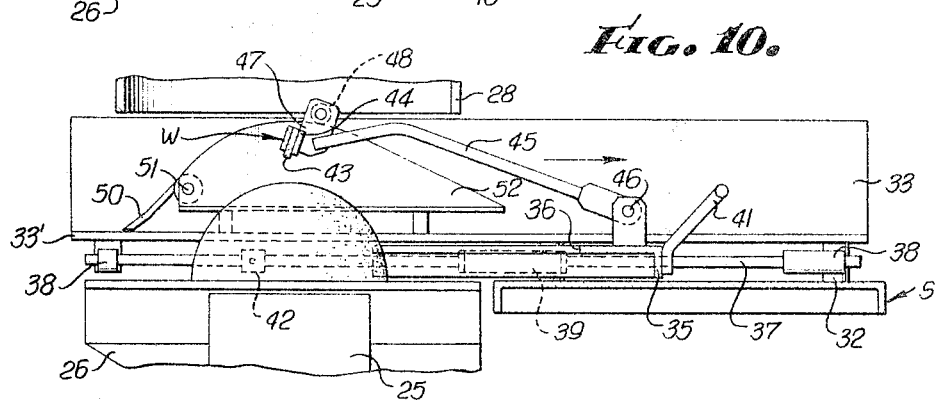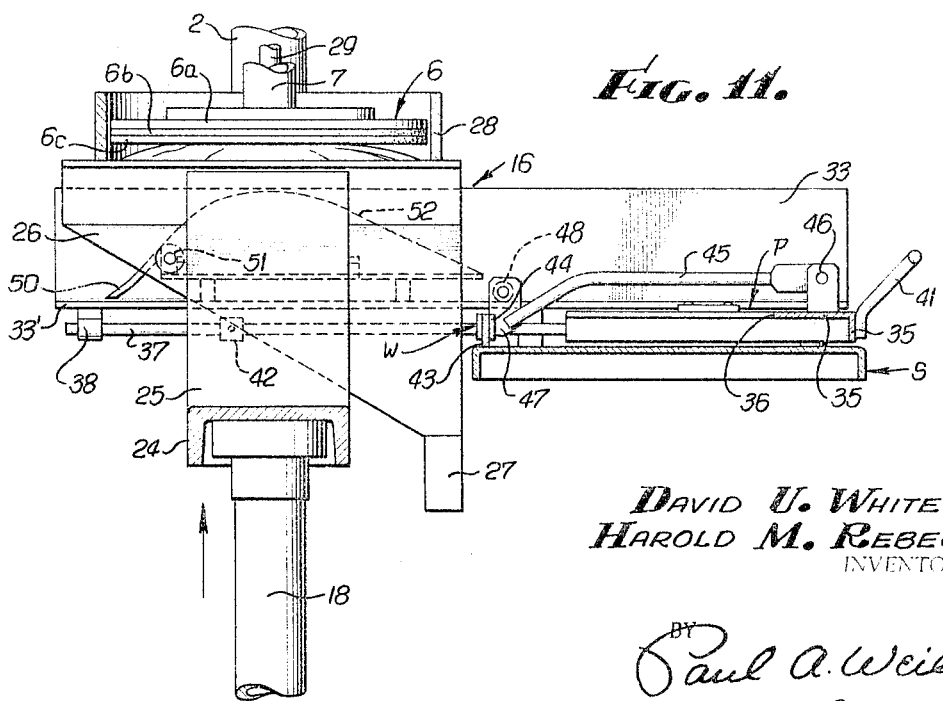

United States Patent Office 3,272,116
Patented Sept. 13, 1966

3,272,116
JUICE EXTRACTOR FOR TESTING CITRUS FRUIT
David U. White, La Habra, Calif., and Harold M. Rebeck, Clearwater, Fla., assignors to Brown Citrus Machinery Corp., Whittier, Calif., a corporation of California
Filed Nov. 5, 1964, Ser. No. 409,180
11 Claims. (Cl. 100—112)

This invention relates to juice extracting apparatus for testing a representative number of pieces of citrus fruit of a given batch or crop to ascertain if the batch or crop contains an amount of juice and soluble solids deemed necessary to qualify it as a marketable product.

It is known that test extractors such as above described have been used. In these extractors fruit halves are subjected to juice extracting pressure between a pair of pressure members one of which is rotated and the other of which constitutes a perforated grid to pass the juice therethrough. Each fruit half is fed between the pressure members by being positioned cut face down on one of the pressure members after which relative movement of such members is effected in a manner to subject the half to the desired pressure while one of the members is rotated.

Operation of the extractor with assurance that optimum amounts of juice will be released with as little as possible of shredding of the rind and pulp, in testing a given batch of fruit thoroughly and quickly, depends upon the manner in which the fruit halves are fed to and positioned between the pressure members and the manner in which the spent halves and residual matter is wiped from the perforated pressure member. It is essential that each fruit half regardless of size be disposed in a predetermined position between the pressure members, it being desired to center or substantially center each fruit half with respect to the rotary pressure member. It is also desired that the operation of so positioning each fruit half be preceded by wiping from the perforated pressure member the spent half previously subjected to pressure together with pulp, seeds, and other residual matter.

It is an object of the present invention to provide an improved test extractor of the character described that includes novel and efficient fruit half feeding and positioning means that will dispose the fruit halves between the pressure members so that each half, regardless of size, will be positioned in approximately the same centered location with respect to the pressure members with each operation of the feeding and positioning means.

Another object of this invention is the provision in a citrus fruit juice extractor having the characteristics hereinbefore noted wherein means for positioning fruit halves between the pressure applying members includes novel means for wiping from the perforate pressure member the spent rind and residual matter following an extraction operation and preliminary to positioning another fruit half in the desired position between the pressure members, the wipe-off means clearing the positioned fruit half upon being retracted.

Further, it is an object of this invention to provide a test extractor such as described which includes an improved construction and arrangement of a stationary fruit half supporting shelf or platform, a stationary rotary pressure member, and a movable and perforated pressure member. This movable pressure member is disposed to move between a loading position in which a fruit half may be moved thereon from the platform, and a position adjacent the rotary member to subject the fruit half to juice extracting pressure between the pressure members. Fruit half positioning means is operable for moving each fruit half from the platform onto the movable pressure member when the latter is in loading position, after which the positioning means is movable to a retracted position to one side of the pressure members. Wipe-off means is embodied in the positioning means so that in the movement of the latter to position a fruit half on the movable pressure member, the spent half and residual matter resulting from a previous extraction operation will be removed from the movable pressure member.

Another object of this invention is the provision in a test extractor of the character described of novel means for supporting in a stationary position to one side of the perforated and reciprocal pressure member, a fruit half supporting platform on which a fruit half may be placed with its cut face downmost and from which the half is movable onto the pressure member when the latter is in its down or retracted position.

Another object of this invention is the provision of novel means associated with the frame of the extractor and the fruit half supporting platform for slidably supporting the fruit half positioning and wipe-off means in such a manner that the positioning and wipe-off means readily and easily may be moved forwardly from position over the platform to a position over the movable pressure member for wiping off this pressure member and positioning a fruit half at the desired location thereon, and thereafter may be retracted to out-of-the-way position overlying the platform.

Further, it is an object of this invention to provide novel means which will operate in a reliable manner to lift the wipe-off means so as to clear the fruit half on the pressure member, in moving the positioning and wipe-off means into retracted position, the wipe-off means being lowered into position over the platform when clear of the pressure member, so that on the next operation of the positioning means, the wipe-off means will remove the rind, pulp and any other residual matter as the next fruit half is being positioned.

Other objects and advantages of the invention will be hereinafter described or will become apparent to those skilled in the art, and the novel features of the invention will be defined in the appended claims.

Referring to the drawings:

FIG. 1 is a side elevation partly in section of a test extractor embodying the present invention;

FIG. 2 is a front elevation of the extractor as shown in FIG. 1;

FIG. 3 is a fragmentary perspective view on an enlarged scale of the fruit half positioning and wipe-off means embodied in the extractor with parts broken away and other parts shown in section for clarity of illustration;

FIG. 4 is a fragmentary sectional view on an enlarged scale taken on the plane of line 4—4 of FIG. 1;

FIG. 5 is a sectional view taken on line 5—5 of FIG. 4;

FIG. 6 is a fragmentary vertical sectional view on an enlarged scale taken on the line 6—6 of FIG. 5;

FIG. 7 is a sectional view on an enlarged scale taken on the line 7—7 of FIG. 5;

FIG. 8 is a fragmentary part sectional, part elevational view of the fruit positioning and wipe-off means as it would appear when the spent fruit has been discharged by the wipe-off means and the fruit half to be treated is in a position just short of the final position in which it is disposed on further movement of the positioning means;

FIG. 9 is a sectional part elevational view similar to FIG. 8 showing the positioning means and the wipe-off means in the final position for disposing a fruit half in centered relation to the pressure members;

FIG. 10 is a view similar to FIG. 9 showing the positioning means and the wipe-off means as it would appear while being retracted after positioning a fruit half as shown in FIG. 9; and FIG. 11 is a view similar to FIG. 10 showing the positioning means and wipe-off means fully retracted and the pressure members in position to apply juice extracting pressure to the fruit half.

Referring more specifically to the drawings, it will be seen that a juice extractor embodying the present invention includes an upright skeleton frame 1 made up primarily of a pair of front legs 2 and a rear leg 3 centered behind the front legs and joined thereto by means of suitable frame members 4 and 5. The member 4 is located near the lower ends of the legs whereas the member 5 is located at the upper ends of the legs. With this arrangement the frame 1 supports all of the working parts of the extractor as a compact and portable unit which readily may be transported from place to place.

In accordance with this invention the frame 1 supports a pair of pressure members which are relatively movable while one of the members is rotatable. When relative movement of these pressure members is effected while one member is rotated, a fruit half between these members will be subjected to the desired juice extracting pressure.

The rotary pressure member designated 6 is preferably circular and fixed on the lower end of a rotary shaft 7 mounted in a suitable bearing 8 carried by the cross member 5. The shaft 7 extends above the cross member 5 through a second bearing 9 supported by an upright extension 10 of the member 5. A pulley 11 on the shaft 7 is dirven by belt 12 from a drive pulley 13 operated by a motor 14 mounted on a bracket 15 extending upwardly from the cross member 5.

The other pressure member designated 16 may be of rectangular form and includes a flat and perforated fruit-supporting plate 17 suitably reinforced by a honeycomb structure 17a secured to the underside thereof.

Means are provided for vertically moving the movable perforated pressure member 16 toward and away from the rotary pressure member 6 and may consist of a piston rod 18 having a piston 19 thereon operable in response to fluid pressure in cylinder 20 pivoted as at 21 on the cross member 4. The upper end of the piston rod 18 is pivotally connected as at 23 to a cross member 24 vertically slidably mounted on the legs 2 and connected with the pressure member 16 by means of a pair of brackets 25. With this arrangement, when the piston 19 and rod 18 may be moved upwardly as the slide member 24 is moved upwardly on the legs 2 and thereby moves the perforated pressure member 16 upwardly to occupy a position adjacent the rotary member 6 for applying juice extracting pressure to a fruit half supported on the member 16.

A funnel member 26 is fixed to the underside of the member 16 between the brackets 25 and has a discharge spout 27 whereby juice extracted from the fruit will gravitate through the perforations in the member 16 into the funnel for discharge through the outlet 27 into a suitable container, not shown.

A splash guard in the form of an annular band or ring 28 is fixed on the lower ends of rods 29 vertically yieldably supported in sockets 30 on the cross member 5 so that the guard 28 is positioned in surrounding relation to the member 6 for contact with the perforate plate 17 when the member 16 is moved into juice extracting position. Springs 31 are mounted in the sockets 30 so as to bias the rods 29 downwardly to hold the guard 28 in position to contact the member 16 in advance of the pressure member 6, the guard 28 then yielding upwardly by reason of the springs 31 so that the two pressure members may be moved into the desired pressure applying position.

The pressure members 6 and 16 are constructed and operated so that all of the juice will be extracted from each fruit half without shredding the rind and pulp in such a manner that the shredded particles may cause clogging of the perforations in the member 16 and interfere with recovery of all of the extracted juice. Accordingly, the opposed faces of the pressure members 6 and 16 which contact the fruit are substantially flat since conical fruit engaging members would cause gouging and maceration or shredding of the rind and pulp, without necessarily expressing all the juice from the fruit half and the pulp.

Inasmuch as the rotary pressure member 6 is rotated while the pressure members are engaged with the fruit, shredding of the rind is also prevented by providing the metal circular body 6a of the pressure member 6 with a pair of elastomeric disks 6b and 6c vulcanized to one another with the member 6b softer than member 6c and vulcanized to the metal disk as a pad for member 6c. With this arrangement the fruit contacting surface of the rotary member 6 is yieldable while engaged with the fruit.

A factor essential to the desired extraction operation is the positioning of each fruit half regardless of size at substantially the same location on the movable pressure member 16, it being desired to position each fruit half substantially opposite the center of the rotary pressure member 6. For this purpose, positioning means P are provided in operative association with a shelf or platform S, which latter is secured by fastenings 32 beneath Z-bars 33 in turn secured by clamps 34 on the legs 2 and projecting horizontally therefrom past and on opposite sides of the pressure member 16. With this arrangement, the platform S will be disposed to one side of the pressure member 16 with the upper surface thereof in alignment with the upper surface of the pressure member 16 when the latter is in lowered or retracted position. The positioning means P as here shown is manually movable from retracted position over the upper surface of the platform S for moving the fruit half into a predetermined position on the member 16. In addition, wipe-off means W is provided as a part of the positioning means P and is arranged to sweep over the upper surface of the pressure member 16 to remove rind and other residual matter resulting from an extracting operation, in advance of the operation of positioning a fruit half on the member 16. This arrangement of the wipe-off means W is such that by the time the positioning means has centered a fruit half on the member 16 the rind and residual matter will have been swept off the member 16 as indicated in FIG. 8.

With reference to FIGS. 3, 4 and 5, it will be seen that the positioning means P includes a slidable fruit positioning member or plate 35 of generally rectangular form having a generally U-shaped notch 36 therein for embracing a fruit half on the platform S so as to center the half in the notch whereby upon movement of the plate over the pressure member 16 the fruit half will be disposed in the desired position on the pressure member. The edge of the fruit positioning plate 35 which defines the bight portion of the U-shaped recess 36 is provided with a short central flat or straight edge portion 36a and on opposite sides of this portion with longer inclined edge portions 36b. With these angularly related edge portions, fruit halves of different sizes will readily be centered in the recess 36 upon contact with the edges 36a and 36b.

Means are provided for slidably supporting the fruit positioning member or plate 35 for movement above and clear of contact with the platform S and member 16 and includes a pair of rods 37 that extend beneath the bottom flange 33' of the Z-bars 33 and are secured to the underside of these flanges by brackets 38 as shown in FIG. 6. Sleeves 39 fixed by brackets 40 on opposite sides of the slide plate 35, as shown in FIGS. 3 and 7, are slidable on the rods so that the plate is slidably supported slightly above the upper surface of the platform S for free movement over and from the movable pressure member 16. A handle 41 on the plate 35 may be grasped to move the plate for positioning a fruit half on the pressure member 16 and for retracting the plate back over the platform S.

When the slide plate 35 of the positioning means P is moved into fully retracted position, ends of the sleeves 39 abut mounting members 38 for the rods, as shown in FIGS. 3 and 4, to limit retraction movement of the plate. When the plate 35 is moved to the final position in which the fruit half is centered on the member 16, sleeves 39 engage a stop 42 mounted on the rods 37 to limit forward movement of the sleeve to the fully extended position shown in FIG. 9. It should be noted that the plate 35 operates in a plane above that of the platform S and member 16 so that when the cut face of a fruit half is rested on a platform in the recess 36, the edges 36a and 36b of the plate defining the recess 36 will contact the fruit half above the bottom or cut face thereof to assure that the fruit half will be centered in the recess and moved readily into centered position onto the pressure member 16 with its cut face downmost.

The wipe-off means W includes a wipe-off blade 43 supported on a cross bar 44 mounted on the ends of arms 45 which latter are pivoted as at 46 on the plate 35. The bar 44 has upstanding end portions 47 thereon mounting rollers 48 which are disposed to roll on the top of the bottom flanges 33' of the Z-bars 33, as the positioning means is moved from between retracted and extended positions. The wipe-off blade 43 may be made of sponge rubber or other suitable elastomeric material so as to reliably sweep the spent fruit halves and other residual matter from the perforated surface of the pressure member 16. This blade 43 is normally gravitationally disposed in down position resting on the upper surface of the platform S. When the half positioning plate 35 is moved over the pressure member 16 to position a fruit half on the latter, the rollers 48 ride on the lower flange 33' of the Z-bars 33 and just before the plate 35 reaches the position as shown in FIG. 8, the rollers 48 will extend under trip members 50 that are pivoted as at 51 on cam members 52 fixed on the flanges 33'. FIG. 8 shows the rollers 48 as engaging under and lifting the trip members 50 just before the plate 35 is extended to its foremost position. FIG. 9 shows how the rollers 48 move past the trip members 50 to permit the latter to drop back onto the flanges 33', when the plate 35 is at the limit of its forward movement at which position the fruit half is properly centered on the member 16.

When the plate 35 is retracted the rollers 48 in being ahead of the trip members 50 will ride over these members as will be apparent with reference to FIGS. 9 and 10 and then ride over the tops of the cam members 52, thereby elevating the wiper blade 43 and the pivoted arms 45 as indicated in FIG. 10 so as to clear the fruit half which has been positioned on the member 16. When the plate 35 reaches the retracted position shown in FIG. 11, the rollers 48 will have moved down off of the cams 52 onto the flanges 33' and the wipe-off member 43 will then rest upon the upper surface of the platform S.

In order that a test extractor embodying the present invention be operable to obtain all of the juice per fruit half without shredding the rind and pulp, suitable control means should be attached to or embodied in the extractor for maintaining the reciprocable pressure member 16 in juice extracting position relative to the rotary pressure member 6 for a predetermined period of time, say three or four seconds, while the rotary pressure member is rotated. Moreover, the rotary pressure member 6 should be slowly rotated, for example, at a rate of about 33 r.p.m. This rate of rotation may be provided for by the gear reduction unit 14a associated with the motor 14.

In addition, it is desired that another control means be provided to prevent upward movement of the pressure member 16 at any time that the positioning means P is moved from fully retracted position and for permitting the member 16 to be elevated only while the positioning means P is in fully retracted position. The two control means aforementioned may be of any suitable form and it has been found that the two control means embodied in the application of Harry A. Foss, entitled Control Means for Fruit Juice Extractor Serial No. 409,179, filed Nov. 5, 1964, are ideally suited to the test extractor of this invention.

One control means is shown, however, in FIG. 2 and may consist of a manually operable valve V to which a pipe line VI leads from a suitable source of compressed air not shown. When this valve is open to admit compressed air to the cylinder 20 the piston 19 is raised and the pressure member 16 is likewise elevated into juice extracting position. Upon closing valve V to shut off the supply of air to the cylinder, an exhaust outlet V2 connected with the valve is in communication with the cylinder so that the compressed air will escape from the latter and the member 16, rod 18 and piston 19, will gravitate to the lowermost position as indicated in FIG. 2. In this position, the member 16 is substantially aligned with the platform S. It should be noted that in instances where the two control means hereinbefore referred to are employed, a different arrangement of this valve V would be made to adapt it to operation by means of such control means.

We claim:

1. A citrus fruit juice extractor comprising, a frame: a platform on said frame for supporting a citrus fruit half with the cut face engaging the platform; a pair of pressure members relatively movable on the frame; positioning means movable between a retracted position above said platform and an extended position over one of said pressure members to move a fruit half from said platform onto said one pressure member; operating means for effecting movement of said one pressure member toward the other pressure member to subject a fruit half to juice extracting pressure; a pair of bars fixed on the frame and extending over and outwardly from said platform with portions thereof on opposite sides of said one pressure member so that said one pressure member is movable between said portions; and guide means operatively connected with said bars for supporting said positioning means for sliding movement between said retracted and extended positions.

2. The citrus fruit juice extractor as set forth in claim 1, wherein said guide means includes a pair of elongate members fixed to and extending along said bars and over and laterally outwardly from said platform; and means carried by said positioning means slidable on said elongate members.

3. The citrus fruit juice extractor as set forth in claim 2 including, means mounting said platform on the undersides of said bars and in spaced relation to said one pressure member.

4. The citrus fruit juice extractor as set forth in claim 1, including wipe-off means carried by said positioning means and operable upon movement of the positioning means into said extended position to wipe from said one pressure member the spent rind and other residual matter produced as a result of a juice extracting operation.

5. Citrus fruit juice extracting means as set forth in claim 4 including pivotal means connecting said wipe-off means with said positioning means; and means carried by said wipe-off means and said bars respectively, cooperable to move said wipe-off means on said pivotal means to a position above a fruit half disposed on said one pressure member during movement of said positioning means into said retracting position.

6. The citrus fruit juice extractor set forth in claim 1, including wipe-off means; mounting means connecting said wipe-off means with said positioning means so that said wipe-off means will wipe over said one pressure member upon moving said positioning means into said extended position and will be retracted onto said platform upon retraction of said positioning means; and means on said bars cooperable with said mounting means to raise said wipe-off means above a fruit half on said one member during movement of said positioning means into said retracted position, and to lower said wipe-off means onto said platform when said positioning means reaches said retracted position.

7. A citrus fruit juice extractor as set forth in claim 1, including: a wiping member; a pair of arms pivoted on said positioning means and connected with said wiping member so that the latter is supported for movement over the surface of said one pressure member to remove spent fruit, pulp and other residual matter therefrom; rollers on said arms arranged to roll on said bars; and cam means on said bars arranged so that during movement of said positioning means into said retracted position, said rollers will ride over said cam means to elevate said bars and wiping member with the latter disposed above the fruit half on said one pressure member, and will roll off said cam means onto said bars to lower said wiping member onto said platform when said positioning means is moved into said retracted position.

8. A citrus fruit juice extractor as set forth in claim 7, wherein said cam means includes arched cam members fixed on said bars in positions such that said rollers will move past the cam members on operating said positioning means to position a fruit half and move said wiping member over said movable pressure member; and trip members pivoted on said cam members operable to direct said rollers thereon and onto said cam members upon said retraction of said positioning means and said wiping members.

9. The citrus fruit juice extractor as set forth in claim 7, wherein said bars are provided with flanges along which said rollers are movable; said cam means including arched cam members fixed on said flanges so as to permit the rollers to move past the cam members in moving said positioning means and wiping member forwardly; and trip members pivoted on said cam members so as to be raised and lowered by said rollers in movement of the rollers past the cam members, said trip members operating when the rollers are moved past them, for directing the rollers thereover to said cam member as said positioning means is being moved to said retracted position.

10. The citrus fruit juice extractor as set forth in claim 1 wherein said platform is supported by said bars; said positioning means including a plate having a recess for embracing a fruit half positioned cut face down on said platform; a pair of rods carried by said bars; and means fixed on said plate and slidable on said rods to slidably support said plate on said rods.

11. The citrus fruit juice extractor as set forth in claim 10, including a pair of arms pivoted on said plate with portions thereof extending forwardly of the plate; a wiping member fixed to said portions of said arms for movement over said one pressure member in advance of said plate; rollers on said arms movable along said bars; and cam means on said bars operable to lift said arms and said wiper member during movement of said positioning means into said retracted position.

References Cited by the Examiner
UNITED STATES PATENTS

| | | | |
|---|---|---|---|
| 2,365,849 | 12/1944 | Strauss | 18—30 |
| 2,811,266 | 10/1957 | Udal | 214—147 |
| 3,185,071 | 5/1965 | Foss et al. | 100—53 |
| 3,185,072 | 5/1965 | Rickard | 100—53 |

LOUIS O. MAASSEL, *Primary Examiner.*